July 17, 1951          C. M. HEARN          2,560,863
GRAPPLE
Filed May 23, 1946          2 Sheets-Sheet 1
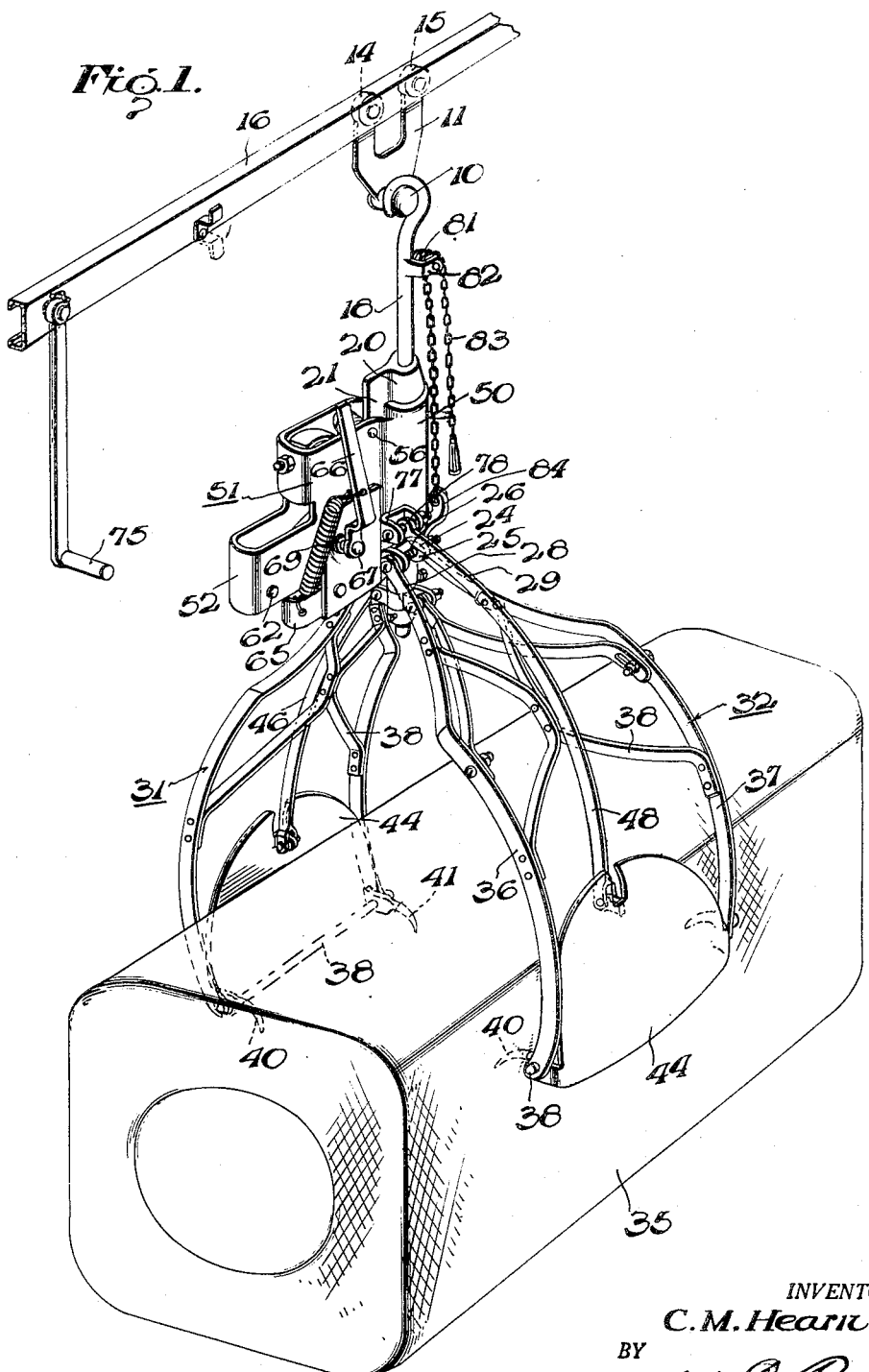
INVENTOR.
C. M. Hearn
BY Wilfred E. Lawson
Attorney July 17, 1951      C. M. HEARN      2,560,863
GRAPPLE
Filed May 23, 1946      2 Sheets-Sheet 2
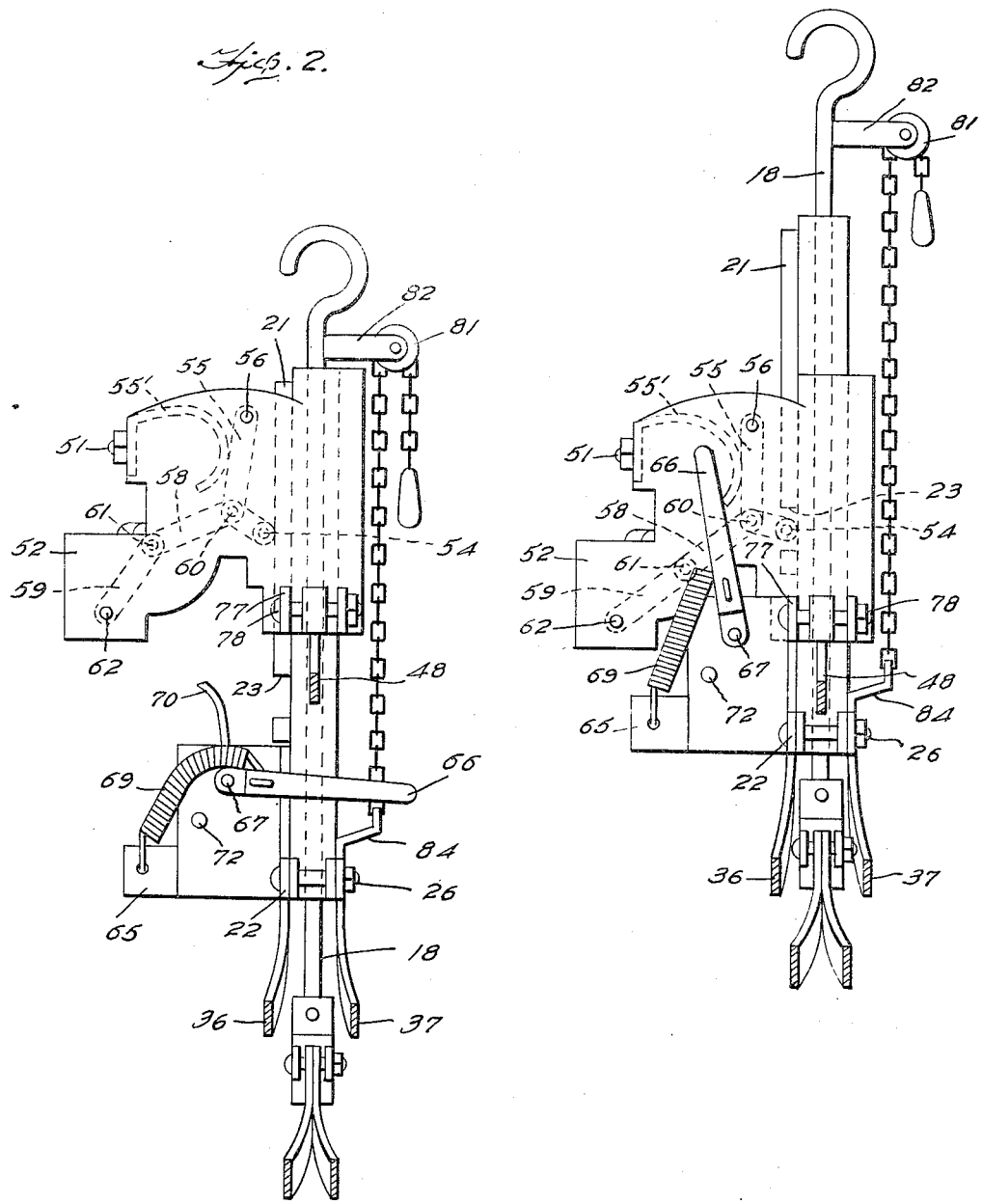
Inventor
C. M. Hearn
By Wilfred E. Lawson
Attorney Patented July 17, 1951

2,560,863

UNITED STATES PATENT OFFICE 2,560,863

GRAPPLE

Carl M. Hearn, Martin, Tenn.

Application May 23, 1946, Serial No. 671,791

3 Claims. (Cl. 294—109)

The present invention relates to a novel grapple for hoisting and automatically releasing bales of material, such as cotton or the like.

An object of the invention is to provide a grapple adapted to traverse a horizontal track, pick up bales of cotton at one point along the track and then automatically release the bales at any desired place farther along the track.

Another object is to provide novel pivoted spike members adapted to bite into the bale material, until they are released by a novel trip arrangement carried by the top of the grapple, whereby upon actuation of the trip, the weight of the bale pivots the spikes out of the bale material and permits the bale to drop.

A further object is to provide a simple and practical labor-saving arrangement for moving heavy bales from one place to another, such as from truck to warehouse.

In the practice of my invention, I may use a system as illustrated in the accompanying drawing. It is to be understood, however, that the scope of this invention shall be determined by reference to the following specification and claims, and not to the specific structure in the drawing.

In the drawing:

Figure 1 is a general perspective view of the invention in use.

Figure 2 illustrates the automatic release linkage for the bale spikes and the release lever for actuating the linkage, the parts being in separated relation as when a bale is released or is ready to be picked up.

Figure 3 is a view in side elevation of the automatic release linkage, similar to Figure 2 but showing the parts coupled together as when the bale spikes are in closed relation.

Referring in detail to the drawing, my grapple comprises a supporting hook 10 engaged over a trolley 11. The trolley 11 has guide rollers 14 and 15 that roll along a track 16.

The hook 10 comprises a shank 18 telescopically mounted within a tubular member 20 provided with an elongated fin or flange 21 with an intermediate cut out portion 23 and at its lower end is mounted a coupler bracket 22, which also carries the lower section of a housing, hereinafter described.

The coupler bracket 22 comprises two pairs of apertured spaced parallel ears 24 and 25, which project from each side of the tubular member 20. Extending through each pair of ears 24 and 25 is a pivot pin 26, see Figure 1; and mounted to pivot thereon are the upper ends 28 and 29 of main grapple jaws 31 and 32.

The grapple jaws are of bowed frame construction and diverge outwardly toward their free ends to provide for the best engagement possible with a cotton bale 35. Each jaw frame comprises side bars 36 and 37 with a brace member 38 riveted between the bars to provide rigidity for heavy loads. Transversely of the free ends of the side bars 36 and 37 is a pivot rod 39 on which pivots the novel prongs or spikes 40 and 41. These spikes have aligned openings through which the pivot rod 39 extends and have integrally formed therewith a relatively large shield member 44 which is pivotally connected to the lower ends of arcuate shaped levers 46 and 48. These levers control the spike members 40 and 41 as hereinafter explained.

Around the tubular member 20 is slidably mounted a tubular sleeve 50 forming a part of the upper section 52 of a housing 51. This tubular sleeve 50 is slotted longitudinally to receive the fin 21 on tubular member 20, so that the longitudinal edge of the fin 21 is engaged by a roller 54 on the end of an L-shaped trip lever 55, until the roller drops into latching position within the cut out part 23.

The lever 55 is pivoted between the walls of upper section 52 on a pin 56 extending through an opening at the top of its longer leg, while to the bottom of the longer leg of the L one link 58 of a toggle is pivoted on a pin 60. The other link 59 of the toggle is pivoted to the end of link 58 by pin 61; and also it is pivoted on a pin 62 mounted between the walls of the lower part of upper housing section 52.

This housing 51 comprises two separable sections, the upper section 52 and a lower section 65, which carries a main trip lever 66 pivoted on a transverse pin 67 extending between and through the walls of the lower housing section 65. A coiled spring 69 normally holds the lever 66 erect, which spring is connected to the housing at one end and to the lever 66 at the other end. Cooperating with the spring 69 to limit the position of the lever 66 are two elements, namely a trip arm 70 having a rounded end and top surface adapted to engage under the toggle at its floating mid-pivot 61, and a transverse stop rod 72 against which the arm 70 is normally biased by the spring; and the main trip lever 66 thus is held erect, until moved clockwise against the action of the spring by a hook trip 75 on the track 16 to thereby retract the roller 54 from the cut-out portion 23 of the fin 21.

The upper housing section 52 has a coupler bracket 53 integrally formed from the lower end of the tubular portion 50 with two pairs of apertured ears, such as 77 and 78 extending from it in alignment above the ears of the lower similar coupling bracket 22 carried by the tubular member 20.

Mounted between these pairs of ears on each side is a pin 79 to which the other end of one of the arcuate levers 46 and 48, is pivoted. Thus when the main lever 66 is pivoted in a clockwise direction by engagement with the hook trip 75, mounted on the track 16, the trip arm 70 rocks upwardly and breaks the toggle, to thereby release the roller 54 from the cut-out portion 23 in fin 21. Promptly that this occurs the weight of the bale 35 will pivot the spikes 40 and 41 on the rods 39, which thus are drawn out of the bale and permit it to drop from between the grapple jaws 31 and 32.

In operation the hook 10 is placed over the trolley 11, and the shank 18 of the hook 10 may be provided with a pulley 81 in a bracket 82. Around the pulley is a cable 83 connected to a lug 84 extending from one side of the coupling bracket 22, so that if the housing sections are separated, as shown in Figure 2, then they may be pulled together to their latched position and the grapple jaws will close around the bale to be hoisted, while simultaneously the spikes or prongs 40 and 41 are pivoted into the bale material.

When the housing sections are in separated relation as shown, the toggle is broken or, in other words, the arms 58 and 59 are angularly related so that the lever 55 is swung outwardly away from the tubular member 20 against the tension of a spring 55'. The roller 54 will thus be engaged against the outer longitudinal edge of the pin 21, the recess 23 of the pin being considerably below the tubular member and away from the roller 54.

Bringing the two housing sections together in the manner stated will shift the cut-out portion 23 of the fin into the proper position to receive the roller 54 whereupon the spring 55' will force the lever 55 over to enter the roller 54 into the cut-out portion of the fin and straighten out the toggle arms 58—59. At the same time the action of the spring 55' will force the joint 61 of the toggle against the trip arm 70 to assist the spring 69 in returning the trip lever 66 to its upright position as is shown in Figure 1. Since the lever 55 and toggle mechanism is carried by the upper housing portion 52 which in turn forms a part of the sleeve 50 and then notched fin 21 is carried by the tubular member 20 it will be seen that the engagement of the roller 54 in the cut-out 23 of the fin will lock the two housing portions 52 and 65 together until such time as the trip lever 66 is thrown over.

After the bale 35 has been gripped in the manner stated, the trolley 11 is run along the track 16, with the grapple and the bale, to an unloading point where the trip hook 75 comes into play to release the sections of the housing one from the other so that the grapple will open and release the bale.

At the unloading position the trip hook 75 is suspended from the track 16 and, as shown, is pivoted so that it may be swung out of the way when the grapple is returned for another load.

When the trip lever 66 engages the trip hook 75 the lever 66 will be rocked over in a clockwise direction, thereby swinging the trip arm 70 upwardly against the joint or pivot coupling 61 between the toggle arms 58 and 59 thereby breaking the toggle and effecting the outward swinging of the lever 55 to disengage the roller from the cut-out 23 of the fin 21. Thus the locking connection between the tubular member 20 and the sleeve 50 is broken and the two sections of the housing may separate to the positions shown in Figure 2. Relative movement of the tubular member 20, the sleeve 50 and the hook shank 18 effects the outward swinging movement of the lower ends of the main jaws 31 and 32 with a resulting outward swinging of the lower ends of the levers 46 and 48. This causes outward swinging of the plates or shield members 44 on the pivots 39 to extract the prongs 40 and 41 from the bale.

Although only one embodiment of the invention has been described, it is to be understood that the same is not limited thereto. Various changes may be made in the design and arrangement of the parts illustrated, as will now be apparent to those skilled in the art. For a definition of the scope of the invention reference should be had to the appended claims.

Access to the trip mechanism within the housing 51 may be had by providing at least one removable wall section.

I claim:

1. A grapple for baled material comprising a suspension hook having a shank, a pair of pivoted members shaped to encompass a bale carried by the said shank pivoted prongs carried by each end of the members, means adapted to turn said pivoted prongs into engagement with the material of the bale, means for locking said first-named means and said prongs in engagement with the bale, a pivoted trip lever, and means actuated by and upon pivotal movement of the trip lever to unlock said second-named means, whereby the weight of said bale serves to pivot said prongs out of engagement with said bale to permit the bale to drop from between the said pivoted members.

2. A grapple for baled material comprising a hook at the top having a shank, a pair of pivoted members shaped to encompass a bale carried by the said shank, pivoted prongs carried by each end of the members, means adapted to turn said pivoted prongs into engagement with the material of the bale, said means comprising plates, arcuate levers pivoted to the plates at one end, said plates carrying the said prongs, a sectional housing movable on said shank, said housing having an upper section to which the other end of said arcuate levers are pivoted and a lower section to which the said pair of members are pivoted, latch members carried by each housing section adapted to engage when the sections are together, and a trip lever adapted to be turned to release the latch members so the housing sections can separate and thereby free the arcuate arms and plates and permit retraction of the pivoted prongs by the weight of the bale.

3. The device as described in claim 2, wherein the latch members comprising, in combination, an L-shaped lever carrying a roller, toggle linkage pivoted to the apex of the lever carried by the upper section of the housing, and a trip arm in the lower housing section, a lever external of the housing, and a tubular portion having a fin projecting into the side of the upper housing with a cut-out portion for engagement with the said roller.

CARL M. HEARN.

REFERENCES CITED

The following references are of record in the file of this patent:

UNITED STATES PATENTS

| Number | Name | Date |
|--------|------|------|
| 243,682 | Beardsley | July 5, 1881 |
| 761,875 | Clark | June 7, 1904 |
| 878,797 | Harding et al. | Feb. 11, 1908 |